(12) United States Patent
Muranaka

(10) Patent No.: US 11,338,506 B2
(45) Date of Patent: May 24, 2022

(54) LAMINATION MOLDING APPARATUS

(71) Applicant: SODICK CO., LTD., Kanagawa (JP)

(72) Inventor: Katsutaka Muranaka, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 294 days.

(21) Appl. No.: 16/848,816

(22) Filed: Apr. 14, 2020

(65) Prior Publication Data

US 2020/0406533 A1 Dec. 31, 2020

(30) Foreign Application Priority Data

Jun. 28, 2019 (JP) .............................. JP2019-120638

(51) Int. Cl.
| | |
|---|---|
| *B29C 64/147* | (2017.01) |
| *B29C 64/268* | (2017.01) |
| *B29C 64/371* | (2017.01) |
| B22F 10/28 | (2021.01) |
| B33Y 40/00 | (2020.01) |
| B33Y 30/00 | (2015.01) |

(52) U.S. Cl.
CPC .......... *B29C 64/147* (2017.08); *B29C 64/268* (2017.08); *B29C 64/371* (2017.08); *B33Y 30/00* (2014.12)

(58) Field of Classification Search
CPC ... B29C 64/147; B29C 64/268; B29C 64/371; B29C 64/153; B33Y 30/00; B33Y 10/00; B33Y 40/00; B22F 10/28; B22F 10/32; B22F 10/77; Y02P 10/25; B03C 3/04

USPC .......................................................... 700/117
See application file for complete search history.

(56) References Cited

U.S. PATENT DOCUMENTS

| | | | |
|---|---|---|---|
| 2017/0165911 A1* | 6/2017 | Kiriyama | .............. B29C 64/232 |
| 2018/0015542 A1 | 1/2018 | Muranaka | |
| 2019/0143410 A1* | 5/2019 | Kawada | ................. B33Y 50/02 |
| | | | 425/78 |

FOREIGN PATENT DOCUMENTS

| | | |
|---|---|---|
| JP | 6095147 | 3/2017 |
| JP | 6410912 | 10/2018 |

* cited by examiner

*Primary Examiner* — Michael J Brown
(74) *Attorney, Agent, or Firm* — JCIPRNET

(57) ABSTRACT

A lamination molding apparatus includes a chamber that covers a molding region, an irradiator that irradiates a material layer formed in the molding region with a laser beam or an electron beam and forms a solidified layer, a supply port that supplies an inert gas to the chamber, a discharge port that discharges the inert gas from the chamber, an inert gas supplier which is connected to the supply port and supplies the inert gas to the chamber, a fume collector, and an oxygen concentration adjustor. The fume collector has an inlet, a charging section, a collecting section, and an outlet. The oxygen concentration adjustor is connected between the discharge port and the charging section and supplies, to the fume collector, an adjusting gas having an oxygen concentration higher than an oxygen concentration of the inert gas which is discharged from the discharge port.

9 Claims, 6 Drawing Sheets

LAMINATION MOLDING APPARATUS

CROSS-REFERENCE TO RELATED APPLICATION

This application claims the priority of Japan patent application serial no. 2019-120638, filed on Jun. 28, 2019. The entirety of the above-mentioned patent application is hereby incorporated by reference herein and made a part of this specification.

BACKGROUND

Technical Field

The disclosure relates to a lamination molding apparatus.

Description of Related Art

A metal-lamination molding apparatus repeats forming a material layer made of a metal material in a predetermined molding region and forming a solidified layer by irradiating the material layer with a laser beam or an electron beam. Then, a predetermined number of solidified layers are laminated to form a desired three-dimensional object.

In such a lamination molding apparatus, in order to prevent the metal material from being altered and appropriately perform molding, a molding region is covered by an airtight chamber, and the chamber is filled with an inert gas having a predetermined concentration during molding.

On the other hand, when the material layer is irradiated with the laser beam or the electron beam, and the material layer is sintered or melted such that the solidified layer is formed, metal vapor called fumes is generated. Hereinafter, solidifying includes both sintering and melting. When the fumes are present in the chamber, the fumes may interrupt the laser beam or the electron beam, or adhere to an optical component such as a window provided at top wall of the chamber, causing a decrease in molding quality.

Hence, in a conventional lamination molding apparatus, an inert gas is supplied to the chamber, and the fume-containing inert gas in the chamber is discharged such that an inside of the chamber is maintained in a clean inert gas atmosphere. In addition, in order to reuse the discharged inert gas, desirably, the inert gas discharged from the chamber is sent to a fume collector, the fumes are removed, and then the inert gas returns to the chamber.

For example, an electrostatic precipitator is used as the fume collector. As disclosed in Japanese Patent No. 6095147, a fume collector which is an electrostatic precipitator charges the fume positively or negatively by corona discharge and collects the charged fumes with a Coulomb force. The fumes in the inert gas are removed by the fume collector.

According to a viewpoint of preventing a metal material from being altered, an oxygen concentration in the chamber needs is as low as possible. Hence, the conventional lamination molding apparatus is configured to further lower the oxygen concentration in the chamber. For example, the chamber of the conventional lamination molding apparatus has high airtightness. However, under an atmosphere having an extremely low oxygen concentration, the corona discharge is unstably generated in the fume collector which is the electrostatic precipitator, and the fumes cannot be removed normally, or the fume collector is stopped due to errors.

An embodiment of the disclosure is to provide a lamination molding apparatus in which an inside of a chamber is maintained at an inert gas atmosphere having a low oxygen concentration suitable for molding, and an oxygen concentration in a fume collector is adjusted to an extent at which corona discharge is appropriately performed.

SUMMARY

According to an embodiment of the disclosure, a lamination molding apparatus is provided which includes: a chamber that covers a molding region; an irradiator that irradiates a material layer formed in the molding region with a laser beam or an electron beam and forms a solidified layer; a supply port which is provided on or in the chamber and through which an inert gas is supplied to the chamber; a discharge port which is provided on or in the chamber and through which the inert gas is discharged from the chamber; an inert gas supplier that is connected to the supply port and supplies the inert gas to the chamber; a fume collector that has an inlet which is connected to the discharge port and to which the inert gas discharged from the chamber is supplied, a charging section having a charging electrode which positively or negatively charges fumes contained in the inert gas sent from the inlet, a collecting section which collects the charged fumes, and an outlet which is connected to the supply port and through which the inert gas, from which the fumes are removed, returns to the chamber; and an oxygen concentration adjustor that is connected between the discharge port and the charging section and supplies, to the fume collector, an adjusting gas having an oxygen concentration higher than an oxygen concentration of the inert gas which is discharged from the discharge port.

DESCRIPTION OF THE EMBODIMENTS

A lamination molding apparatus according to the disclosure is configured to supply an inert gas into a chamber by an inert gas supplier and to supply an adjusting gas from a position upstream of a fume collector which is an electrostatic precipitator. The adjusting gas has an oxygen concentration higher than an oxygen concentration of the inert gas which is discharged from the chamber. In this manner, an inside of the chamber is maintained in an inert gas atmosphere with a low oxygen concentration, and an oxygen concentration in the fume collector is adjusted to a concentration suitable for electrostatic precipitation. Further, the lamination molding apparatus is maintained in an environment suitable for forming a three-dimensional object with high precision.

Hereinafter, an embodiment of the disclosure will be described with reference to the drawings. Various features illustrated in the following embodiment may be combined with each other.

Figure 1:
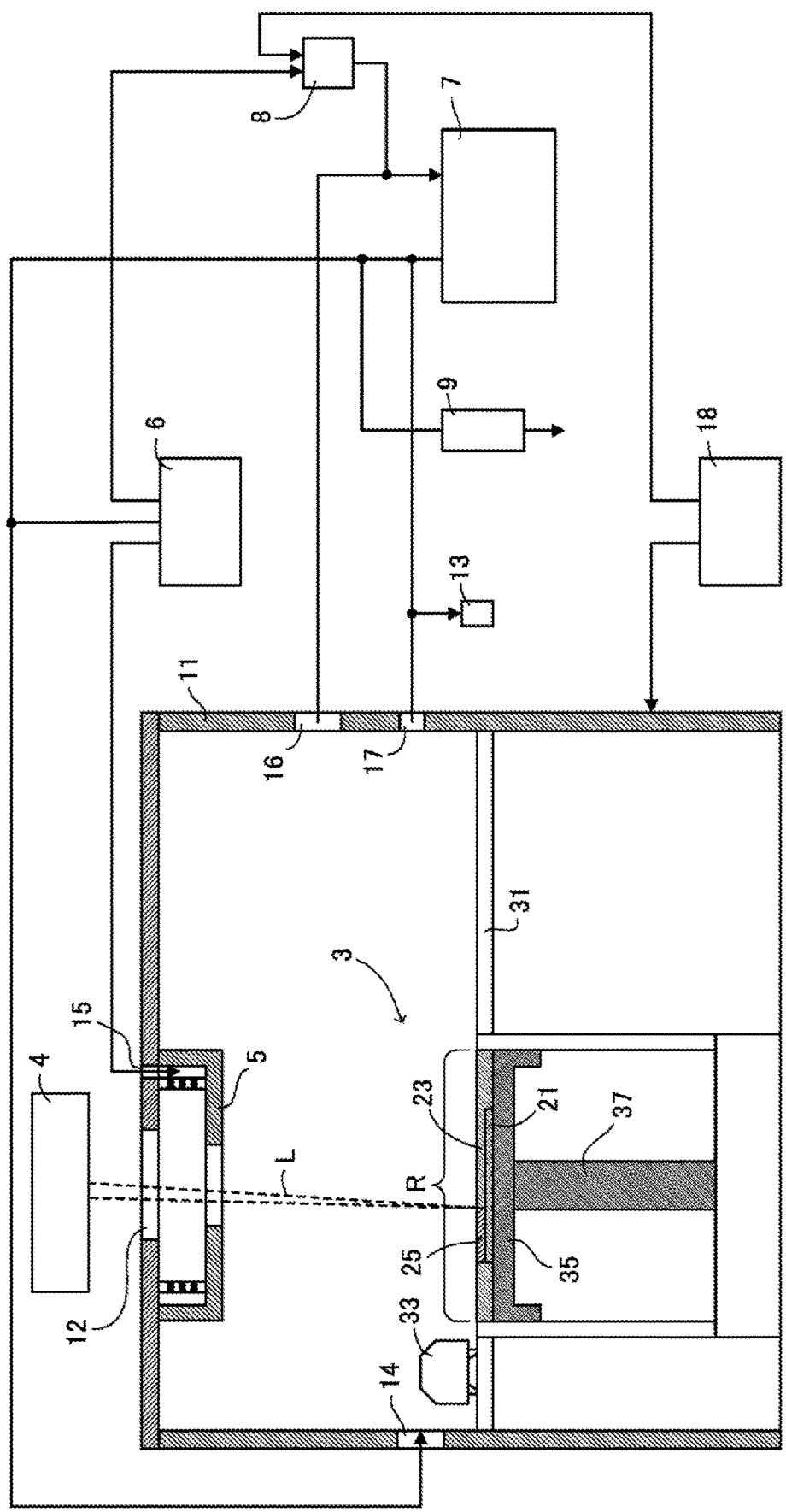
FIG. 1 illustrates a schematic configuration of a lamination molding apparatus of an embodiment.

As illustrated in FIG. 1, A lamination molding apparatus of the embodiment includes a chamber 11, a material layer former 3, an irradiator 4, a contamination preventor 5, and an inert gas supplying and discharging mechanism.

The chamber 11 is configured to be substantially airtight except for a supply/discharge route of an inert gas and covers a molding region R which is a region in which a desired three-dimensional object is formed.

The material layer former 3 is provided in the chamber 11. The material layer former 3 includes a base 31 having the molding region R and a recoater head 33 disposed on the base 31 and configured to be movable in one horizontal axis direction. A blade is provided at each of both side surfaces of the recoater head 33. A material supplier (not illustrated) supply material powder to the recoater head 33. The recoater head 33 reciprocates in the one horizontal axis direction, while the material power contained in the recoater head 33 is discharged from a bottom surface of the recoater head 33. At this time, the blades flatten the material powder discharged from the recoater head 33 so as to form a material layer 23. In the molding region R, a molding table 35 which is movable in a vertical direction by a molding table driving device 37 is provided. At a time of using the lamination molding apparatus, a base plate 21 is disposed on the molding table 35, and the first material layer 23 is formed on the base plate 21.

Figure 2:
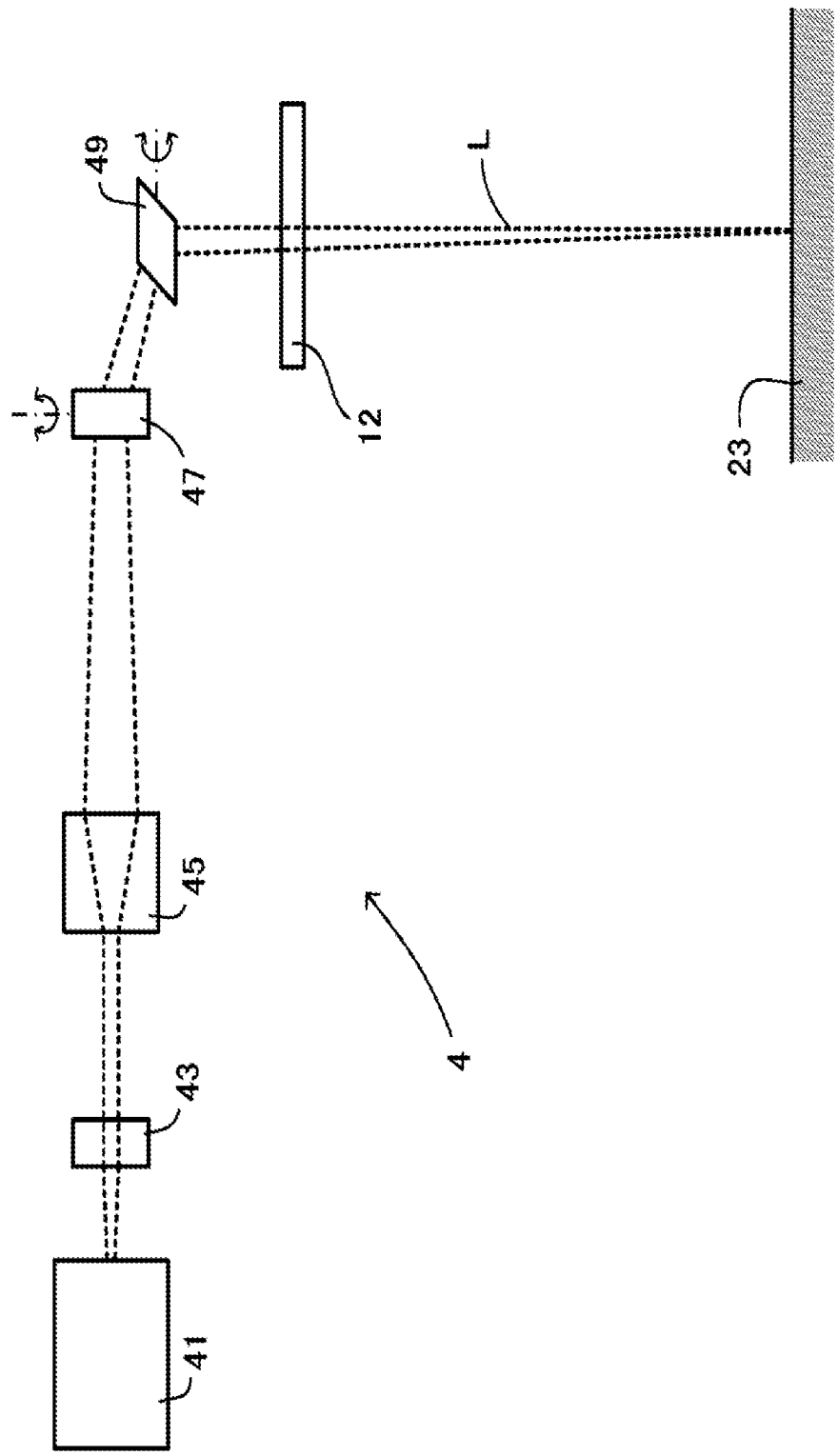
FIG. 2 illustrates a schematic configuration of an irradiator.

The irradiator 4 is provided above the chamber 11. The irradiator 4 of the embodiment irradiates, with a laser beam L, a predetermined position on the material layer 23 which is formed on the molding region R so as to sinter or melt material powder at the predetermined position to form a solidified layer 25. As illustrated in FIG. 2, the irradiator 4 has a light source 41, a collimator 43, a focus control unit 45, and a galvano scanner. The focus control unit 45 has a diffusing lens, a condensing lens, and an actuator that causes the diffusing lens to relatively move with respect to the condensing lens. The galvano scanner has an X-axial galvano mirror 47, an actuator that rotates the X-axial galvano mirror 47, a Y-axial galvano mirror 49, and an actuator that rotates the Y-axial galvano mirror 49.

The light source 41 generates the laser beam L. Here, a type of laser beam L is not limited as long as the material layer 23 can be sintered or melted with the laser beam L, and examples of the laser beams L include a $CO_2$ laser beam, a fiber laser beam, and a YAG laser beam. The collimator 43 converts the laser beam L output from the light source 41 into a parallel light beam. The focus control unit 45 adjusts the laser beam L output from the light source 41 to have a desired spot diameter. The galvano scanner performs two-dimensional scanning with the laser beam L output from the light source 41. Specifically, rotation angles of the X-axial galvano mirror 47 and the Y-axial galvano mirror 49 are controlled depending on a magnitude of a rotation angle control signal which is input from a control device (not illustrated), and scanning with the laser beam L is performed in both an X-axial direction and a Y-axial direction.

The laser beam L penetrating the X-axial galvano mirror 47 and the Y-axial galvano mirror 49 is transmitted through a window 12 provided in top wall of the chamber 11 such that the material layer 23 formed in the molding region R is irradiated with the laser beam L. The window 12 is formed by a material that can transmit the laser beam L. For example, when the laser beam L is the fiber laser beam or the YAG laser beam, the window 12 may be formed by quartz glass.

Moreover, the irradiator may irradiate and solidify the material layer 23 with an electron beam and form the solidified layer 25. For example, the irradiator may be configured to include a cathode electrode, an anode electrode, a solenoid, and a collector electrode. The cathode electrode discharges electrons. The anode electrode causes the electrons to converge and accelerates the electrons. The solenoid forms a magnetic field to cause directions of electron beams to converge on one direction. The collector electrode is electrically connected to the material layer 23 which is an irradiation target. A voltage is applied between the cathode electrode and the collector electrode.

The material layer former 3 and the irradiator 4 described above form the desired three-dimensional object. First, the base plate 21 is placed on the molding table 35, and a height of the molding table 35 is adjusted to an appropriate position. Next, the recoater head 33 moves over the molding region R from left to right in FIG. 1, and the first material layer 23 is formed on the base plate 21. Next, the irradiator 4 irradiates a predetermined position on the first material layer 23 with the laser beam L, and the first solidified layer 25 is formed. Similarly, the height of the molding table 35 is lowered by one layer of the material layer 23. The recoater head 33 moves over the molding region R from right to left in FIG. 1, and the second material layer 23 is formed on the first solidified layer 25. Next, the irradiator 4 irradiates a predetermined position on the second material layer 23 with the laser beam L, and the second solidified layer 25 is formed. The first solidified layer 25 and the second solidified layer 25 are sticked to each other. Processes described above are repeatedly performed, and thereby the third solidified layer 25 and subsequent solidified layers are formed sequentially. In this manner, forming of the material layer 23 and the solidified layer 25 is repeatedly performed, and the desired three-dimensional object is formed.

Figure 3:
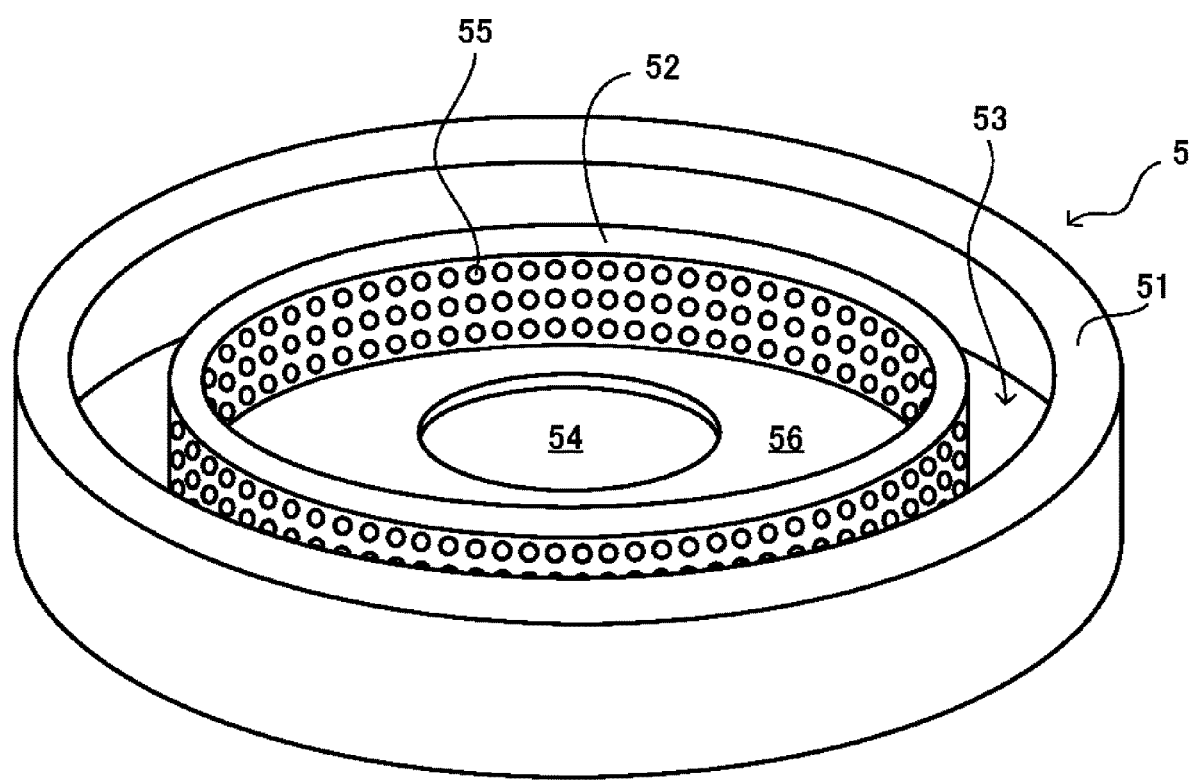
FIG. 3 is an enlarged view of a contamination preventor.

The contamination preventor 5 is provided on the top wall of the chamber 11 to cover the window 12. As illustrated in FIG. 3, the contamination preventor 5 has a cylindrical housing 51 and a cylindrical diffusion member 52 disposed in the housing 51. An inert gas supply space 53 is provided between the housing 51 and the diffusion member 52. In addition, at a bottom surface of the housing 51, an opening 54 is provided on an inner side of the diffusion member 52. The diffusion member 52 has multiple fine pores 55, and is filled with a clean inert gas supplied to the inert gas supply space 53 passes through the fine pores 55 and fills a clean space 56. Then, the clean inert gas filling the clean space 56 is ejected downward the contamination preventor 5 through the opening 54. The contamination preventor 5 prevents the window 12 from being contaminated with fumes which are generated during forming of the solidified layer 25. Moreover, the contamination preventor 5 prompts the fumes, which are about to get across an irradiation route of the laser beam L, to be excluded from the irradiation route.

Here, the inert gas supplying and discharging mechanism of the embodiment is described. The inert gas supplying and discharging mechanism fills the chamber 11 with an inert gas having a predetermined concentration. In addition, the inert gas supplying and discharging mechanism discharges an inert gas containing fumes from the chamber 11, removes most of the fumes from the discharged inert gas, and causes the fume-removed inert gas to return to the chamber 11. The inert gas supplying and discharging mechanism includes an inert gas supplier 6, a fume collector 7, an oxygen concentration adjustor 8, and an exhaust device 9.

One or more supply ports are provided on or in the chamber 11. At least one of the inert gas which is supplied from the inert gas supplier 6 and the inert gas which is caused to return from the fume collector 7 is supplied through the supplier port to the chamber 11. In the embodiment, a first supply port 14 and a second supply port 15 are provided as the supply ports. The first supply port 14 is provided in a side wall of the chamber 11 and is connected to the inert gas supplier 6 and the fume collector 7. The inert gas having a predetermined concentration is supplied from the inert gas supplier 6 to the chamber 11 via the first supply port 14. In addition, the inert gas, from which most of the fumes are removed by the fume collector 7, returns to the chamber 11 via the first supply port 14. The second supply port 15 is provided in the top wall of the chamber 11 and is connected to the inert gas supplier 6. The inert gas is supplied to the inert gas supply space 53 of the contamination preventor 5 via the second supply port 15. In order to prevent the fumes from being adhered to the window 12, desirably, only the inert gas supplier 6 is connected to the second supply port 15.

One or more discharge ports are provided on or in the chamber 11. The inert gas containing the fumes is discharged from the chamber 11 to the fume collector 7 through the discharge port. In the embodiment, a discharge port 16 is provided as the discharge port in the side wall of the chamber 11. The inert gas containing the fumes is discharged via the discharge port 16 to the fume collector 7.

The number or positions of the supply ports and the discharge ports are not limited to the embodiment described above. For example, any number of supply ports and discharge ports may be provided in the side wall or the top wall of the chamber 11 or at any positions of a constituent member in the chamber 11 such as the recoater head 33. In addition, the supply port connected to the inert gas supplier 6 and the supply port connected to the fume collector 7 may be separately provided.

The inert gas supplier 6 supplies the inert gas having the predetermined concentration to the chamber 11. Specifically, the inert gas supplier 6 is an inert gas generator that extracts the inert gas from ambient air or a gas cylinder in which the inert gas is stored. The inert gas which is supplied from the inert gas supplier 6 is desirably a gas having purity as high as possible. In other words, an oxygen concentration in the inert gas supplied from the inert gas supplier 6 is preferably about 0%. In the embodiment, as the inert gas supplier 6, a PSA-type nitrogen generator configured to be capable of generating a nitrogen gas having a concentration of about 99.99% is used. Moreover, the inert gas refers to a gas which substantially does not react with the material layer 23 made of a metal material, the solidified layer 25 formed by solidification of the metal material, and other gases containing oxygen. For example, the inert gas is nitrogen.

Figure 4:
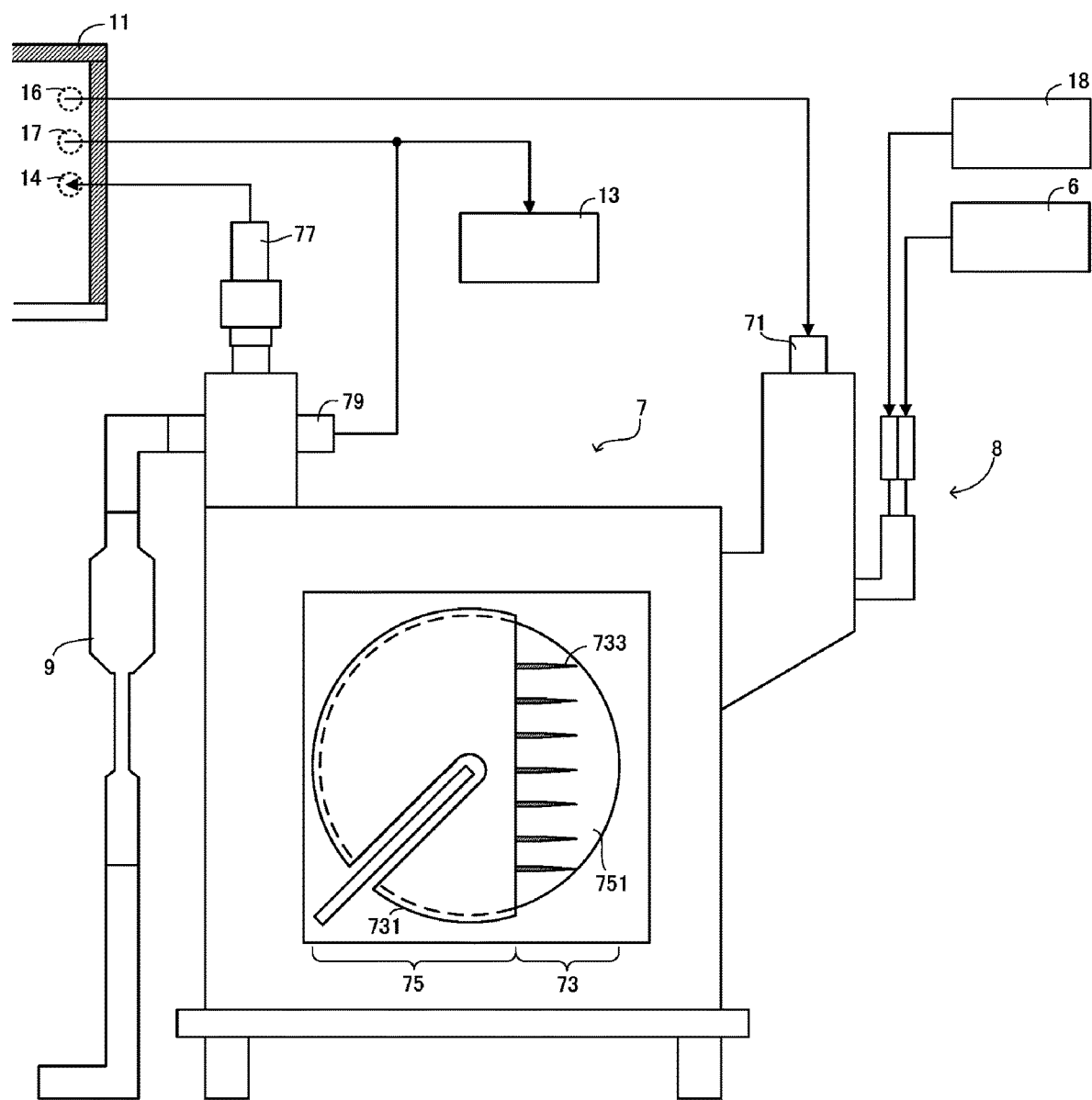
FIG. 4 illustrates a schematic configuration of a fume collector.

The fume collector 7 is an electrostatic precipitator which removes most of the fumes from the inert gas discharged from the chamber 11 and then causes the inert gas to return to the chamber 11. As illustrated in FIG. 4, the fume collector 7 includes an inlet 71, a charging section 73, a collecting section 75, and an outlet 77. The inlet 71 is connected to the discharge port 16, and the inert gas discharged from the chamber 11 is supplied to the charging section 73 through the inlet 71. The charging section 73 positively or negatively charges the fumes contained in the inert gas sent from the inlet 71. The collecting section 75 collects the charged fumes. The outlet 77 is connected to the first supply port 14, and the inert gas, from which most of the fumes are removed, returns to the chamber 11 through the outlet 77. The fume collector 7 of the embodiment is a one-stage electrostatic precipitator, in which the charging section 73 and the collecting section 75 are integrally formed. That is, the charging section 73 and the collecting section 75 have a plurality of charging plates 731 provided at predetermined intervals, needle-shaped charging electrodes 733 attached to the charging plates 731, and collecting plates 751 provided respectively between the charging plates 731. A high voltage is applied to the charging plates 731 and the charging electrodes 733 by a voltage supply unit (not illustrated), and the fumes are positively or negatively charged by corona discharge. The collecting plates 751 are grounded, and the charged fumes are collected on the collecting plates 751 with a Coulomb force. Moreover, the fume collector 7 of the embodiment is the one-stage electrostatic precipitator as described above; however, the fume collector 7 may also be a two-stage electrostatic precipitator, in which the charging section 73 and the collecting section 75 are configured separately from each other.

The oxygen concentration adjustor 8 supplies, to the fume collector 7, an adjusting gas having an oxygen concentration higher than an oxygen concentration of the inert gas which is discharged from the discharge port 16. That is, the oxygen concentration of the adjusting gas is higher than the oxygen concentration of the inert gas which is supplied by the inert gas supplier 6. The oxygen concentration adjustor 8 is connected to any position upstream of the fume collector 7, that is, between the discharge port 16 and the charging section 73. Specifically, the oxygen concentration adjustor 8 may be connected to a pipe which connects the discharge port 16 and the inlet 71 or may be connected to a position upstream of the charging section 73 of the fume collector 7. As described above, when the oxygen concentration in the fume collector 7 is lower than a predetermined value, the charging section 73 unstably generates corona discharge. For example, in the fume collector 7 of the embodiment, when the oxygen concentration is lower than about 0.6 vol %, the corona discharge is unstably generated. Therefore, the adjusting gas having the oxygen concentration higher than the oxygen concentration at which the corona discharge is unstably generated is supplied from the position upstream of the fume collector 7, and thereby the corona discharge can be stably generated. The oxygen concentration in the chamber 11 slightly increases compared with a case in which the oxygen concentration adjustor 8 is not provided. However, since the adjusting gas is directly supplied to the fume collector 7, an increase in the oxygen concentration in the chamber 11 is suppressed within a range in which the molding is not hindered. For example, in the embodiment, an adjusting gas having an oxygen concentration of about 7.0 vol % is supplied from the position upstream of the fume collector 7, and the oxygen concentration in the fume collector 7 is adjusted to about 0.6 vol % or higher. At this time, the oxygen concentration in the chamber 11 becomes about 0.7 vol % or lower, preferably, about 0.6 vol % or lower.

The adjusting gas is desirably a mixed gas of the same inert gas as the inert gas supplied from the inert gas supplier 6 and an oxygen-containing gas. In addition, the oxygen-containing gas may be any gas that contains oxygen and is preferably air. In the embodiment, the inert gas supplied from the inert gas supplier 6 and air are mixed to generate the adjusting gas.

Figure 5:
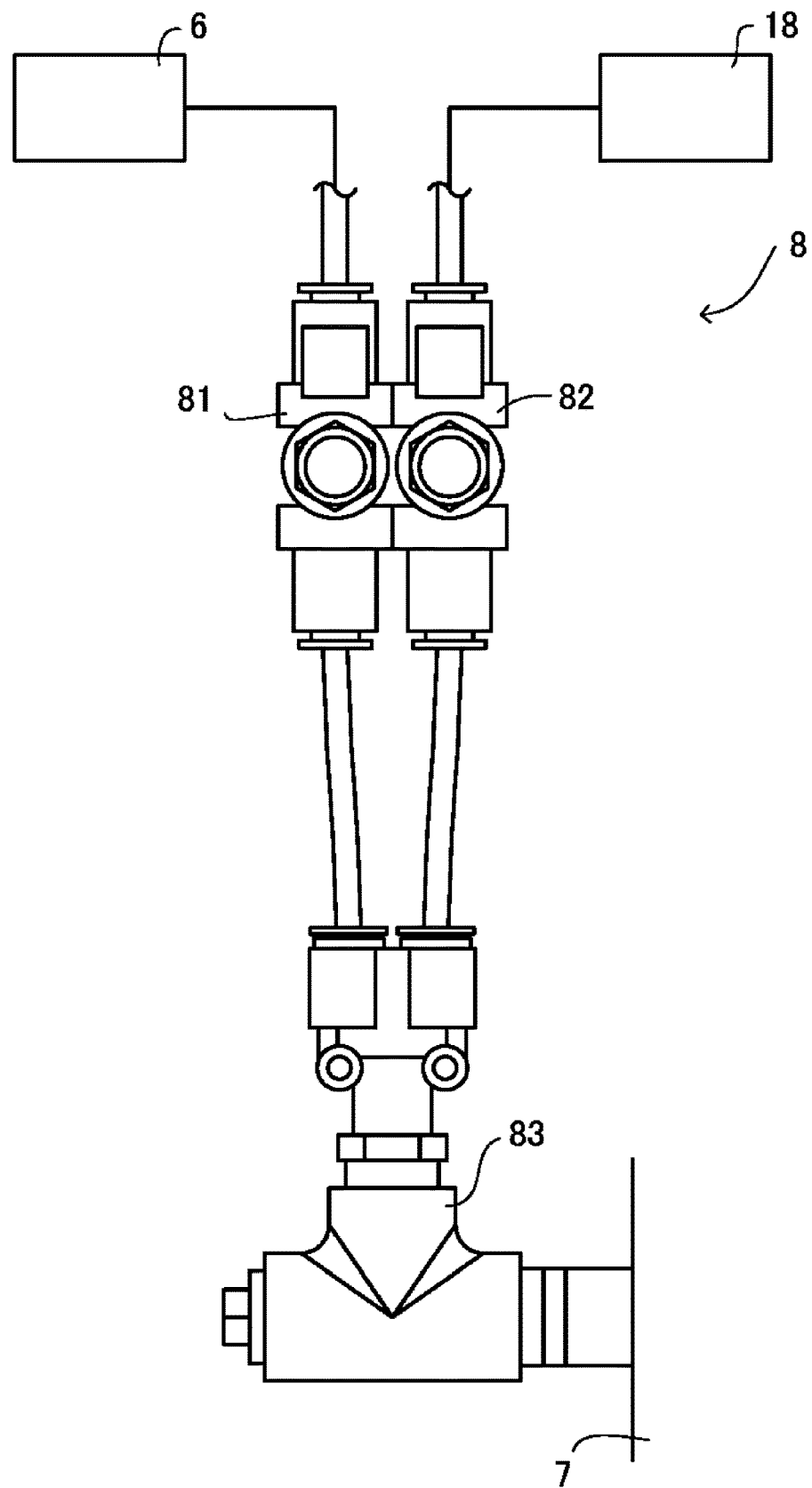
FIG. 5 is an enlarged view of an oxygen concentration adjustor.

The oxygen concentration adjustor 8 of the embodiment is illustrated in FIG. 5. The oxygen concentration adjustor 8 includes a first flow control valve 81, a second flow control valve 82, and a joint 83. The first flow control valve 81 and the second flow control valve 82 are, for example, a speed controller or a regulating valve. The first flow control valve 81 is connected to the inert gas supplier 6 and adjusts a flow rate of the inert gas. The second flow control valve 82 is connected to an oxygen-containing gas supplier 18 supplying the oxygen-containing gas and adjusts a flow rate of the oxygen-containing gas. In the embodiment, the oxygen-containing gas supplier 18 is an air compressor. For example, when the lamination molding apparatus includes a pneumatic drive device, the air compressor is connected to the pneumatic drive device. In this case, the air compressor may be used as the oxygen-containing gas supplier 18. The joint 83 is connected to each of the first flow control valve 81, the second flow control valve 82, and the fume collector 7. The inert gas and the oxygen-containing gas sent via the first flow control valve 81 and the second flow control valve 82 are mixed in the joint 83 and sent to the fume collector 7.

The oxygen concentration of the adjusting gas is desirably adjusted to an oxygen concentration lower than a limiting oxygen concentration of the fumes, that is, a lower limit oxygen concentration at which the fumes ignite. For example, when the metal material is an iron-based material such as maraging steel, the limiting oxygen concentration of the fumes is about 8.0 vol %. Hence, when the metal material is an iron-based material such as maraging steel or the like, the oxygen concentration of the adjusting gas is adjusted to lower than about 8.0 vol %. In this manner, at least the oxygen concentration in the fume collector 7 is kept lower than the limiting oxygen concentration of the fumes, and thus it is possible to configure the lamination molding apparatus more safely.

An oxygen analyzer 13 that detects the oxygen concentration is provided on the lamination molding apparatus. The oxygen analyzer 13 is connected to a port 17 provided on the chamber 11 and a port 79 provided on the fume collector 7. In order to prevent the fumes from being adhered to the oxygen analyzer 13, the port 79 is desirably provided downstream of the fume collector 7. Moreover, when the oxygen concentrations in the chamber 11 and the fume collector 7 need to be individually detected, two oxygen analyzers 13 may be provided to be connected to the port 17 and the port 79, respectively. The oxygen analyzer 13 is connected to the control device (not illustrated). When the oxygen concentration detected by the oxygen analyzer 13 is equal to or higher than a predetermined threshold value, the control device controls the fume collector 7 to stop voltage application to the charging electrodes 733. In addition, when the oxygen concentration detected by the oxygen analyzer 13 is equal to or lower than the predetermined threshold value, the control device pauses the irradiation with the laser beam L. In the embodiment, when a detection value of the oxygen analyzer 13 is 3.0 vol % or higher, voltage application to the charging electrodes 733 is stopped, and the irradiation with the laser beam L is paused. In this configuration, it is possible to perform high-quality lamination molding more safely.

Figure 6:
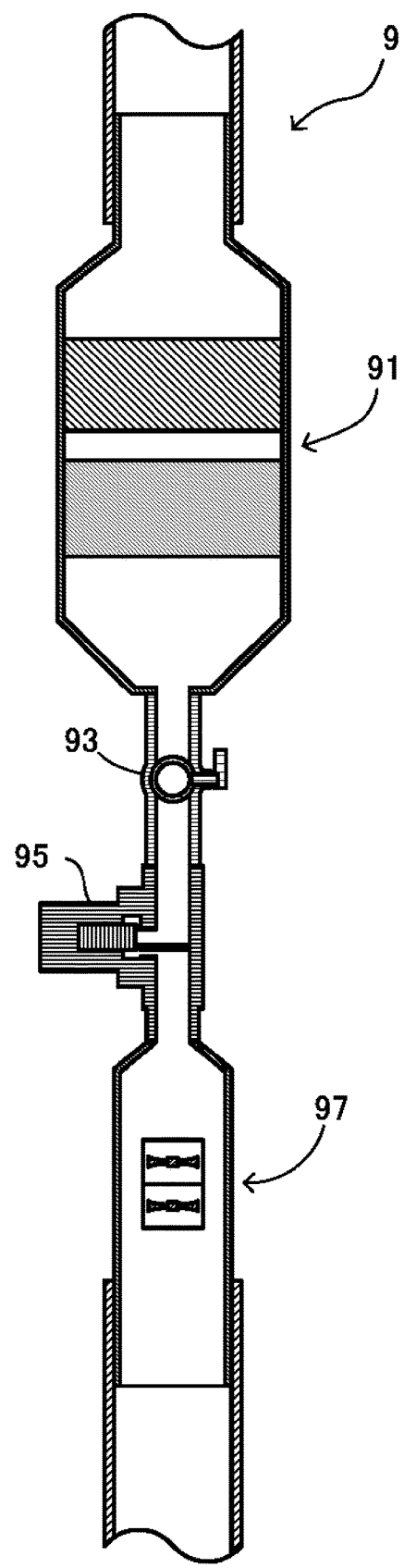
FIG. 6 is an enlarged view of an exhaust device.

The exhaust device 9 exhausts, to the outside of the lamination molding apparatus, the inert gas from which most of the fumes are removed by the fume collector 7. The exhaust device 9 causes an atmospheric pressure in the chamber 11 and an atmospheric pressure outside the lamination molding apparatus to become substantially uniform so as to prevent the fume-containing inert gas from leaking out of the chamber 11. As illustrated in FIG. 6, the exhaust device 9 has a filter 91, a regulating valve 93, an on-off valve 95, and a fan motor 97.

The filter 91 is configured of, for example, a nonwoven-fabric filter and an HEPA filter and removes fumes from the inert gas which are exhausted to the outside of the apparatus. Since the exhaust device 9 is connected to a position downstream of the fume collector 7, that is, between the collecting section 75 and the first supply port 14, most of the fumes are removed in advance from the inert gas which is sent to the exhaust device 9. Hence, although it is not necessary to provide the filter 91, the filter 91 can further clean the inert gas which is exhausted.

The regulating valve 93 is, for example, a ball valve and regulates an exhaust amount of the inert gas. The fan motor 97 forms an air flow in an exhaust direction. The regulating valve 93 and the fan motor 97 regulates a sum of the exhaust amount from the exhaust device 9 and the leaking amount per time to a supply amount or higher per time from the inert gas supplier 6.

The on-off valve 95 is, for example, an electromagnetic valve, and switches between ON/OFF of the exhaust. The control device (not illustrated) controls the on-off valve 95 and the fan motor 97 according to the atmospheric pressure in the chamber 11 that is measured by a pressure gauge (not illustrated) and the oxygen concentration measured by the oxygen analyzer 13. That is, the on-off valve 95 is opened and the fan motor 97 is operated only when the atmospheric pressure in the chamber 11 is equal to or higher than the predetermined threshold value, and the oxygen concentration is lower than the predetermined threshold value. In this manner, the inert gas is prevented from leaking from the chamber 11 within a range in which no influence is applied to the molding.

As described above, the embodiments of the disclosure are described; however, the embodiments are provided as examples only and do not intend to limit the scope of the disclosure. The novel embodiments may be realized in various other forms, and various omissions, replacements, or modifications can be performed within a range not departing from the gist of the disclosure. Technical features illustrated in the embodiments may be combined with each other within a range in which the features are technically compatible with each other. The embodiments and modification examples are included in the scope or gist of the disclosure and are included in the scope of the claims and in a range equivalent to the disclosure.

For example, the lamination molding apparatus may further include a cutting device and may perform a cutting process on the solidified layer 25 during or after molding. For example, the cutting device has a spindle head that rotates a cutting tool such as an end mill and a processing head on which the spindle head is provided and which is movable to a desired position. According to the cutting device, whenever a predetermined number of the solidified layers 25 are formed, it is possible to perform the cutting process on an end surface of the solidified layers 25. Alternatively, the cutting device has a slewing mechanism that holds the cutting tool such as a tool bit and a processing head on which the slewing mechanism is provided. According to the cutting device, it is possible to perform shaping on a surface parallel to the molding table 35 and two surfaces vertical to the molding table 35 and perpendicular to each other after molding, forming a reference surface after a secondary process is performed.

In addition, the oxygen concentration adjustor 8 of the embodiment constantly supplies the adjusting gas during molding; however, the oxygen concentration adjustor 8 may include an on-off valve such as an electromagnetic valve so as to switch ON/OFF of supply depending on the oxygen concentration. For example, the control device (not illustrated) may control the on-off valve so that the adjusting gas is supplied only when the oxygen concentration in the fume collector 7 is lower than the predetermined threshold value, and the supply of the adjusting gas is stopped when the oxygen concentration in the fume collector 7 is equal to or higher than the predetermined threshold value. At this time, desirably, the two oxygen analyzers 13 are provided and are connected to the chamber 11 and the fume collector 7, respectively.

In addition, the oxygen concentration adjustor 8 of the embodiment mixes the inert gas supplied from the inert gas supplier 6 with the oxygen-containing gas supplied from the oxygen-containing gas supplier 18 so as to generate the adjusting gas; however, the oxygen concentration adjustor 8 may be any adjustor that can supply, to the fume collector 7, an adjusting gas having an oxygen concentration higher than that of the inert gas supplied by the inert gas supplier 6. For example, the oxygen concentration adjustor 8 may be an inert gas generator that generates an inert gas having purity lower than that of the inert gas supplied by the inert gas supplier 6 or a gas cylinder that stores an inert gas having purity lower than that of the inert gas supplied by the inert gas supplier 6.

What is claimed is:

1. A lamination molding apparatus, comprising:
   a chamber that covers a molding region;
   an irradiator that irradiates a material layer formed in the molding region with a laser beam or an electron beam and forms a solidified layer;
   a supply port which is provided on or in the chamber and through which an inert gas is supplied to the chamber;
   a discharge port which is provided on or in the chamber and through which the inert gas is discharged from the chamber;
   an inert gas supplier that is connected to the supply port and supplies the inert gas to the chamber;
   a fume collector that has an inlet which is connected to the discharge port and to which the inert gas discharged from the chamber is supplied, a charging section having a charging electrode which positively or negatively charges fumes contained in the inert gas sent from the inlet, a collecting section which collects the charged fumes, and an outlet which is connected to the supply port and through which the inert gas, from which the fumes are removed, returns to the chamber; and
   an oxygen concentration adjustor that is connected between the discharge port and the charging section and supplies, to the fume collector, an adjusting gas having an oxygen concentration higher than an oxygen concentration of the inert gas which is discharged from the discharge port.

2. The lamination molding apparatus according to claim 1, wherein the inert gas is nitrogen.

3. The lamination molding apparatus according to claim 1, wherein the adjusting gas is a mixed gas of the inert gas and an oxygen-containing gas.

4. The lamination molding apparatus according to claim 3, wherein the oxygen-containing gas is air.

5. The lamination molding apparatus according to claim 3, wherein the oxygen concentration adjustor has
   a first flow control valve connected to the inert gas supplier,
   a second flow control valve connected to an oxygen-containing gas supplier that supplies the oxygen-containing gas, and
   a joint which is connected to the first flow control valve, the second flow control valve, and the fume collector and supplies, to the fume collector, the adjusting gas generated by mixing the inert gas and the oxygen-containing gas.

6. The lamination molding apparatus according to claim 1, wherein an oxygen concentration of the adjusting gas is lower than a limiting oxygen concentration of the fumes.

7. The lamination molding apparatus according to claim 1, further comprising:
   an oxygen analyzer which is connected to the fume collector.

8. The lamination molding apparatus according to claim 7, wherein the oxygen analyzer is further connected to the chamber.

9. The lamination molding apparatus according to claim 7, wherein, when an oxygen concentration measured by the oxygen analyzer is equal to or higher than a predetermined threshold value, the fume collector stops voltage application to the charging electrode.

* * * * *